United States Patent
Usami

(10) Patent No.: US 6,238,764 B1
(45) Date of Patent: May 29, 2001

(54) OPTICAL INFORMATION RECORDING DISC

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/427,264

(22) Filed: Oct. 26, 1999

Related U.S. Application Data

(62) Division of application No. 08/937,010, filed on Sep. 24, 1997, now Pat. No. 5,989,669.

(30) Foreign Application Priority Data

| Sep. 24, 1996 | (JP) | 8-273099 |
| Sep. 25, 1996 | (JP) | 8-275580 |
| Oct. 28, 1996 | (JP) | 8-302420 |
| Oct. 28, 1996 | (JP) | 8-302421 |
| Dec. 26, 1996 | (JP) | 8-358553 |
| Feb. 7, 1997 | (JP) | 9-39970 |

(51) Int. Cl.$^7$ .................................................. B32B 3/02
(52) U.S. Cl. ............... 428/64.1; 428/64.2; 428/64.4; 428/64.8; 428/457; 428/913; 430/270.14; 430/945.1; 369/283; 369/288
(58) Field of Search .................................. 428/64.1, 64.2, 428/64.4, 64.8, 457, 913; 430/270.14, 495.1, 945; 369/283, 288

(56) References Cited

U.S. PATENT DOCUMENTS

| Re. 35,947 | 11/1998 | Kosinski et al. ............ 428/64.1 |
| 5,085,910 | 2/1992 | Matsushima et al. ......... 428/64.1 |
| 5,213,859 | 5/1993 | Aoi et al. .................... 428/64.1 |
| 5,382,460 | 1/1995 | Onagi et al. ................. 428/64.1 |
| 5,635,268 | 6/1997 | Miyake et al. ............... 428/64.1 |

*Primary Examiner*—Elizabeth Evans
(74) *Attorney, Agent, or Firm*—Sughrue, Mion, Zinn, Macpeak & Seas, PLLC

(57) ABSTRACT

An optical information recording disc of DVD (Digital Video Disc) type having an information recordable layer(s) between a pair of substrates (i.e., sandwich structure) shows an improved mechanical strength and an improved storage stability when the substrate has an exposed area on its outer peripheral edge and the exposed area is placed in contact with a resin layer, or the substrate has an enlarged surface area (preferably it is exposed) on its outer peripheral edge and the enlarged surface area is placed in contact with a resin layer. An apparatus for preparing an optical information recording disc of DVD type having an improved mechanical strength and an improved storage stability is further disclosed.

19 Claims, 21 Drawing Sheets

47

47

47

13

47

Fig. 22(a) Fig. 22(b)
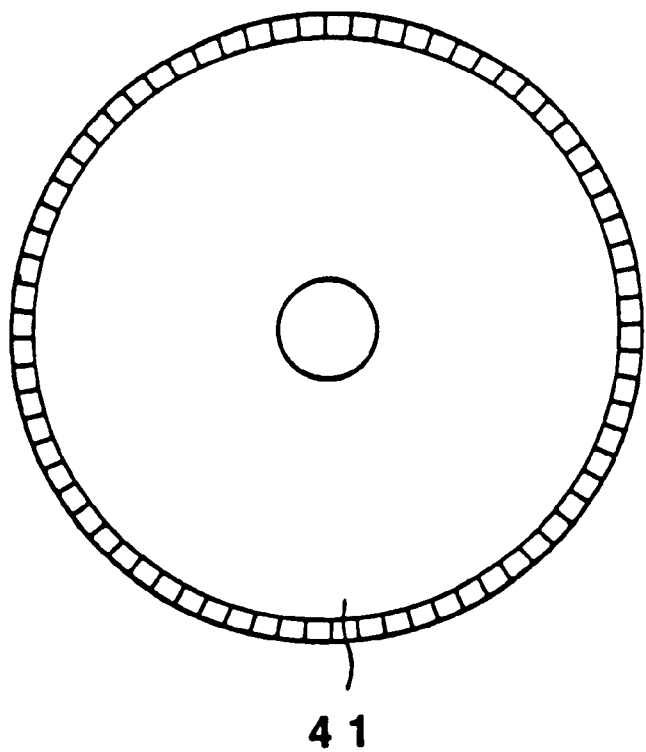
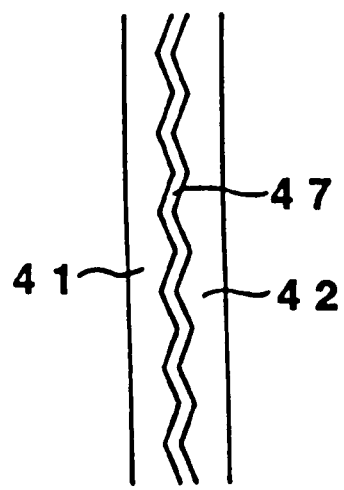

OPTICAL INFORMATION RECORDING DISC

This is a divisional of Application No. 08/937,010 filed Sep. 24, 1997 now U.S. Pat. No. 5,989,669 issued Nov. 23, 1999, the disclosure of which is incorporated herein by reference.

FIELD OF THE INVENTION

The present invention relates to an optical information recording disc, an apparatus for preparing an optical information recording disc, and a process for preparing an optical information recording disc. In particular, the invention relates to an optical information recording disc of DVD (Digital Video Disc) type.

BACKGROUND OF THE INVENTION

Recently, an optical information recording disc of DVD (Digital Video Disc) type has been paid an attention, because the information recording disc of DVD type can record a great amount of information in a limited space volume. The information recording discs of DVD type are classified into DVD-RCM (for read-out only), DVD-R (in which additional information is recordable), and DVD-RAM (in which a recorded information is rewritable).

The information recording disc of DVD type has a sandwich structure. In more detail, it comprises a pair of substrate discs having an information recorded layer from which the information is readable by applying thereto a laser beam or an information recordable layer in which Can information is recordable by applying thereto a laser beam or comprises a substrate disc having an information recorded layer from which the information is readable by applying thereto a laser beam or an information recordable layer in which an information is recordable by applying thereto a laser beam and a disc plate. The pair of substrates or the set of substrate and disc plate is combined using an adhesive layer under the condition that the information recorded layer or information recordable layer is placed between them.

Nikkei Electronics, No. 630 (1995, published Nihon Keizai Shimbunsha, namely, Japan Economic Journal), Specific Edition for "Optical Disc", as well as Nikkei New Media, Specific Edition for "DVD" (1995, published Nihon Keizai Shimbunsha) illustrate a schematic structure of a representative optical information recording disc of DVD-R type, which is shown in FIG. 1 of Drawings attached to this specification.

The representative information recording disc of DVD-R type of FIG. 1 comprises a pair of substrate discs 1a, 1b having a pre-groove for tracking, information recordable layers 2a, 2b placed on the substrate discs 1a, 1b, respectively, laser beam reflective layers 3a, 3b placed on the information recordable layers 2a, 2b, respectively, protective layers 4a, 4b, placed on the reflective layers 3a, 3b, respectively, and an adhesive layer 5 combining the protective layer 4a and the protective layer 4b. This information recording disc is produced by combining a pair of substrate discs 1a, 1b which are provided thereon with the information recording layer 2a, 2b, the reflective layer 3a, 3b, and the protective layer 4a, 4b, using an adhesive material 5.

The present inventor has studied the optical information recording disc of DVD-type and has noticed that the information recording disc of DVD-type sometimes shows poor mechanical strength as well as poor storage stability. A further study of the inventor has revealed that the poor mechanical strength and poor storage stability are caused by partial peeling of the edges of the substrates from the assembled recording disc structure. The peeling is sometimes observed between the substrate and the protective layer. The recording layer generally comprises a dye and, possibly, a small amount of a binder, and therefore, it has low cohesion strength. Moreover, the bonding strength between the reflective layer which is generally made of metal and the protective layer which is generally made of organic resin is low. Accordingly, the substrate disc easily separates from the protective layer at their outer peripheral ends when the information disc encounters physical shock or is stored for a long period under severe surrounding conditions. Particularly, if the substrate disc has a fin or flash at its outer or inner peripheral end, the separation occurs more easily when the information disc is brought into contact with other information disc or any other materials.

SUMMARY OF THE INVENTION

The present invention has an object to provide an optical information recording disc showing an improved mechanical strength and an improved storage stability.

The invention has a specific object to provide of an optical information recording disc of DVD-type having an improved mechanical strength and an improved storage stability.

In the first aspect, the present invention resides in an optical information recording disc comprising a pair of substrate discs which have a center hole and which are provided thereon with a recording layer, a reflective layer and a protective layer overlaid in order, the substrate discs being combined via an adhesive layer to place their protective layers between them, or comprising a substrate disc which has a center hole and which is provided thereon with a recording layer, a reflective layer and a protective layer overlaid in order and a disc plate, the substrate disc and the disc plate being combined via an adhesive layer to place the protective layer between them, wherein both the recording layer and reflective layer are retracted from the outer peripheral end of the substrate disc so that the substrate disc is exposed in the retracted area and the protective layer is kept in contact with the substrate disc in the exposed area.

In the above-mentioned information recording disc, it is preferred that both the recording layer and reflective layer are further retracted from the peripheral end of the center hole so that the substrate disc is exposed in thus retracted area and the protective layer is kept in contact with the substrate disc in thus exposed area. Further, it is preferred that the adhesive layer is also kept in contact with the substrate disc in the exposed area. The information recording layer preferably is a dye layer.

In the second aspect, the invention resides in an optical information recording disc comprising a pair of substrate discs which have a center hole and which are provided thereon with a recording layer, a reflective layer and a protective layer overlaid in order, the substrate discs being combined via an adhesive layer to place their protective layers between them, or comprising a substrate disc which has a center hole and which is provided thereon with a recording layer, a reflective layer and a protective layer overlaid in order and a disc plate, the substrate disc and the disc plate being combined via an adhesive layer to place the protective layer between them, wherein the substrate disc is processed at its outer peripheral end to form an enlarged surface area and the reflective layer is retracted from the outer peripheral end of the substrate.

In the above-mentioned information recording disc, wherein both the recording layer and reflective layer are preferably retracted from the outer peripheral end of the substrate disc so that the substrate disc is exposed in the retracted area and the protective layer is kept in contact with the substrate disc in the exposed area. It is further preferred that the substrate disc is further processed at its inner peripheral end to form an enlarged surface area, both the recording layer and reflective layer are further retracted from the inner peripheral end so that the substrate disc is exposed in thus retracted area, and the protective layer is kept in contact with the substrate disc in thus exposed area. It is further preferred that the adhesive layer is also kept in contact with the substrate disc in the exposed area. Thee processing for forming the enlarged surface area has been performed preferably by roughing or chamfering the outer peripheral end of the substrate disc. The recording layer preferably is a dye layer.

In the third aspect, the invention resides in an optical information recording disc comprising a pair of substrate discs which have a center hole and which are provided thereon with a recording layer and a reflective layer overlaid in order, the substrate discs being combined via an adhesive layer to place their reflective layers between them, or comprising a substrate disc which has a center hole and which is provided thereon with a recording layer and a reflective layer overlaid in order and a disc plate, the substrate disc and the disc plate being combined via an adhesive layer to place the reflective layer between them, wherein both the recording layer and reflective layer are retracted from the outer peripheral end of the substrate disc so that the substrate disc is exposed in the retracted area and the adhesive layer is kept in contact with the substrate disc in the exposed area.

In the above-mentioned information recording disc, it is preferred that both the recording layer and reflective layer are further retracted from the peripheral end of the center hole so that the substrate disc is exposed in thus retracted area and the adhesive is kept in contact with the substrate disc in thus exposed area. The recording layer preferably is a dye layer.

In the fourth aspect, the invention resides in an optical information recording disc comprising a pair of substrate discs which have a center hole and which are provided thereon with a recording layer and a reflective layer overlaid in order, the substrate discs being combined via an adhesive layer to place their reflective layers between them, or comprising a substrate disc which has a center hole and which is provided thereon with a recording layer and a reflective layer overlaid in order and a disc plate, the substrate disc and the disc plate being combined via an adhesive layer to place the reflective layer between them, wherein the substrate disc having is processed at its outer peripheral end to form an enlarged surface area and the reflective layer is retracted from the outer peripheral end of the substrate.

In the above-mentioned information recording disc, it is preferred that both the recording layer and reflective layer are retracted from the outer peripheral end of the substrate disc so that the substrate disc is exposed in the retracted area and the adhesive is kept in contact with the substrate disc in the exposed area. It is further preferred that the substrate disc is further processed at its inner peripheral end to form an enlarged surface area, both the recording layer and reflective layer are further retracted from the inner peripheral end so that the substrate disc is exposed in thus retracted area and the adhesive layer is kept in contact with the substrate disc in thus exposed area. It is furthermore preferred that the adhesive layer is also kept in contact with the substrate disc in the exposed area. The processing for forming the enlarged surface area has been performed preferably by roughing or chamfering the outer peripheral end of the substrate disc. The recording layer preferably s a dye layer.

In the fifth aspect, the invention resides in an apparatus for combining a pair of substrate discs having an information recorded layer from which the information is readable by applying thereto a laser beam or an information recordable layer in which an information is recordable by applying thereto a laser beam or combining a substrate disc having an information recorded layer from which the information is readable by applying thereto a laser beam or an information recordable layer in which an information is recordable by applying thereto a laser beam and a disc plate using an adhesive layer under the condition that the information recorded layer or information recordable layer is placed between them, to prepare an optical information recording disc, comprising at least one pressure disc plate which has an effective pressure diameter smaller than the diameter of the substrate disc and that of the disc plate.

The above-mentioned apparatus preferably comprises a pair of pressure disc plates which have an effective pressure diameter smaller than the diameter of the substrate disc and that of the disc plate. It is preferred that the effective pressure diameter of the pressure disc plate is 90% to 98% (preferably 92% to 98%, more preferably 95% to 98%) of the diameter of the substrate disc and that of the disc plate. It is further preferred that the substrate disc and the disc plate diameter have a center hole and the diameter of the center hole of the pressure disc plate is larger than the diameter of the center hole of the substrate disc and that of the disc plate, preferably 1.01 to 1.1 times, more preferably 1.02 to 1.08 times.

In the sixth aspect, the invention resides in a process for combining a pair of substrate discs having an information recorded layer from which the information is readable by applying thereto a laser beam or an information recordable layer in which an information is recordable by applying thereto a laser beam or combining a substrate disc having an information recorded layer from which the information is readable by applying thereto a laser beam or an information recordable layer in which an information is recordable by applying thereto a laser beam and a disc plate using an adhesive layer under the condition that the information recorded layer or information recordable layer is placed between them, utilizing a pair of pressure disc plates which have an effective pressure diameter smaller than the diameter of the substrate disc and that of the disc plate.

In the seventh aspect, the invention resides in an apparatus for combining a pair of substrate discs having an information recorded layer from which the information is readable by applying thereto a laser beam or an information recordable layer in which an information is recordable by applying thereto a laser beam or combining a substrate disc having an information recorded layer from which the information is readable by applying thereto a laser beam or an information recordable layer in which an information is recordable by applying thereto a laser beam and a disc plate using an adhesive layer under the condition that the information recorded layer or information recordable layer is placed between them, comprising at least one pressure disc plate which has a surface having a hardness less than the hardness of the substrate disc and that of the disc plate.

The above-mentioned apparatus preferably comprises a pair of pressure disc plates which have a surface having a hardness less than the hardness of the substrate disc and that of the disc plate. The hardness of the surface of the pressure disc plate preferably is in the range of 10% to 80% of the hardness of the substrate disc and that of the disc plate, in which the hardness is expressed in terms of Rockwell hardness. The surface of the pressure disc plate is preferably made of elastic material such as silicone rubber or chloroprene rubber.

In the eighth aspect, the invention resides in a process for combining a pair of substrate discs having an information recorded layer from which the information is readable by applying thereto a laser beam or an information recordable layer in which an information is recordable by applying thereto a laser beam or combining a substrate disc having an information recorded layer from which the information is readable by applying thereto a laser beam or an information recordable layer in which an information is recordable by applying thereto a laser beam and a disc plate using an adhesive layer under the condition that the information recorded layer or information recordable layer is placed between them, utilizing a pair of pressure disc plates which have a surface having a hardness less than the hardness of the substrate disc and that of the disc plate.

BRIEF DESCRIPTION OF DRAWINGS

FIGS. 22(a)–(b) illustrates other variation of the characteristic structure of the information recording disc of the invention.

DETAILED DESCRIPTION OF THE INVENTION

Figure 1:
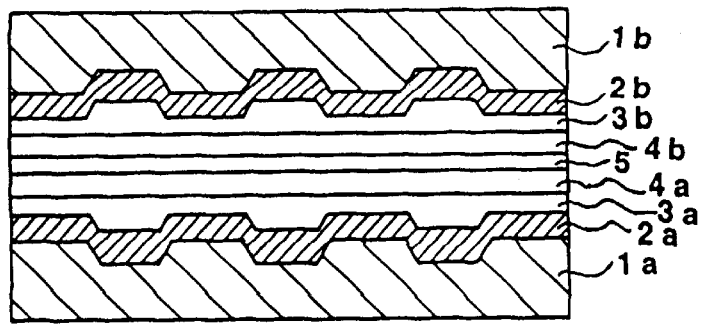
FIG. 1 illustrates a schematic view of a known optical information recording disc of DVD-R type.

The optical information recording disc of the invention is further described below.

The optical information recording disc of the invention comprises a pair of substrate discs which have a center hole and which are provided thereon with a recording layer and a reflective layer (optionally, and a protective layer) overlaid in order, the substrate discs being combined via an adhesive layer to place their recording layers and reflective layers between them. One of the substrate discs having a center hole and being provided thereon with a recording layer and a reflective layer (optionally, and a protective layer) can be replaced with a disc plate which generally is the same as the substrate disc per se.

The substrate disc (or disc plate) can be made of acrylic resin, vinyl chloride resin such as polyvinyl chloride or a copolymer of vinyl chloride and other monomer, epoxy resin, polycarbonate, amorphous polyolefin, or polyester. Other polymers can be employed. Preferred are polycarbonate, polyolefin and cell-cast polymethyl methacrylate.

On the surface of the substrate disc, a subbing layer can be provided for improving the surface smoothness, adhesion conditions, keeping the recording layer from the substrate disc, or for other reasons. The subbing layer can be made of polymethyl methacrylate, acrylic acid-methacrylic acid copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate, vinyl chloride copolymer, polyethylene, polypropylene, polycarbonate or other polymer, or inorganic material such as an inorganic oxide (e.g., $SiO_2$ or $Al_2O_3$) or an inorganic fluoride (e.g., $MgF_2$). The subbing layer can be formed on the substrate disc using a conventional coating method such as spin coat, dip coat, or extrusion coat, or a conventional vacuum deposition such as sputtering or ion plating.

On the substrate disc or the subbing layer, a pregroove or pre-pit can be formed. Otherwise, a pregroove or pre-pit forming layer on which the pregroove or pre-pit is to be formed can be placed on the substrate disc or the subbing layer. The pre-groove or pre-pit forming layer can be made of a mixture of a monomer or oligomer of a monoester, diester, triester or tetraester of acrylic acid and a photopolymerization initiator, utilizing a conventional method.

The information recording layer is preferably made of a dye. A small amount of a polymer binder can be incorporated into the recording layer. Examples of the dyes include cyanine dyes, phthalocyanine dyes, imidazoquinoxaline dyes, pyrylium dyes, thiopyrylium dyes, azulenium dyes, squalilium dyes, metal complex dyes such as Ni complex dyes and Cr complex dyes, naphthoquinone dyes, anthraquinone dyes, indophenol dyes, merocyanine dyes, oxonol dyes, indoaniline dyes, triphenylmethane dyes, triallylmethane dyes, aluminum-containing dyes, diinmonium dyes, and nitroso compounds. Preferred are cyanine dyes, phthalocyanine dyes, azulenium dyes, squalilium dyes, oxonol dyes, and imidazoquinoxaline dyes.

The dye-containing information recording layer can be formed by coating a solution of a dye (and a binder, if necessary) in a solvent on the substrate disc or the subbing layer, and drying the coated layer.

The information recording layer generally has a thickness of 10 to 550 nm.

The recording layer can be composed of two or more dye-containing layers. In that case, an intermediate layer (barrier layer) can be placed between the adjacent dye-containing layers. The intermediate layer can be prepared by using a resin such as one described for the subbing layer. The intermediate layer generally has a thickness of 1 to 100 μm.

On the information recording layer, a reflective layer is placed. The reflective layer is made of material which shows a high reflectance to a laser beam, such as metal or semimetal. Examples of the reflective materials include Mg, Se, Y, Ti, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi. Preferred are Au, Ag, Cu, Pt, Al, Cr and Ni. Most preferred is Au.

These metals can be employed singly or in combination. For instance, a metal alloy can be employed. The reflective layer generally has a thickness of 10 to 200 nm.

The reflective layer is then coated with a protective layer. The protective layer can be made of a thermoplastic resin, a heat curable resin, a UV (ultraviolet) curable resin, or a mixture thereof. The UV curable resin is preferred. Examples of the UV curable resins include oligomers of (meth)acrylates such as urethane (meth)acrylate, epoxy (meth)acrylate and polyester (meth)acrylate, and monomers such as (meth)acrylic acid ester. A photopolymerization initiator can be employed in combination with these oligomers and monomers.

The protective layer generally has a thickness of 0.1 to 100 μm, preferably 1 to 15 μm.

The provision of the protective layer may be omitted.

The adhesive layer which is employed for combining a pair of the above-prepared composites or the composite with a simple substrate disc (i.e., disc plate) can be made of an adhesive resin. The adhesive resin can be the resin described above for the protective resin. The UV curable resin is preferably employed.

The adhesive layer generally has a mean thickness of 0.1 to 100 μm, preferably 20 to 80 μm, most preferably 30 to 70 μm.

The characteristic features of the information recording disc according to the invention are described by referring to the attached figures.

Figure 2:
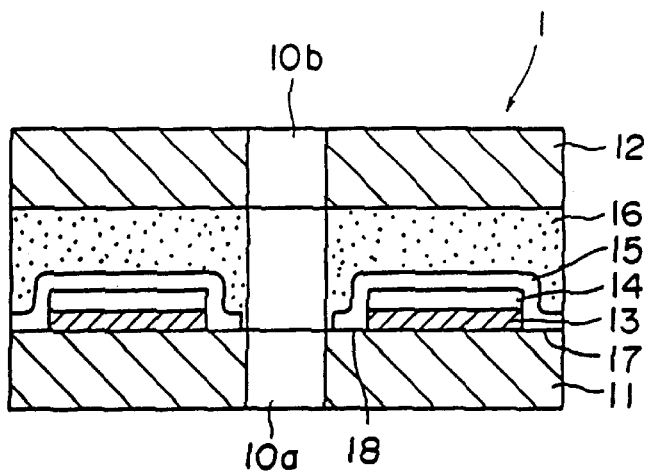
FIG. 2 illustrates one example of the preferred structures of the information recording disc of the invention.

FIG. 2 illustrates one example of the preferred structures of the invention. The information recording disc 1 is composed of two resinous substrate discs 11, 12 (the substrate disc 12 may be referred to as "disc plate") which have center holes 10a, 10b, respectively and in which the substrate disc 11 is provided thereon with a recording layer 13 and a reflective layer 14 (both are retracted from the outer and inner peripheral edges to leave areas 17, 18 in which the surface of the substrate disc 11 is exposed), and further a protective resin layer 15 which is coated over the reflective layer 14 and is in contact with the exposed areas 17, 18, and an adhesive layer 16.

The protective layer 15 is in contact with the resinous substrate disc 11 in the outer and inner peripheral exposed area 17, 18. Therefore, the protective layer 15 is firmly bonded to the substrate disc 11. The bonding between the protective layer 15 and the adhesive layer 16 is naturally firm, and the bonding between the adhesive layer 16 and the resinous substrate disc 12 is also firm. Therefore, the information recording disc of FIG. 2 has a high mechanical strength.

Figure 3:
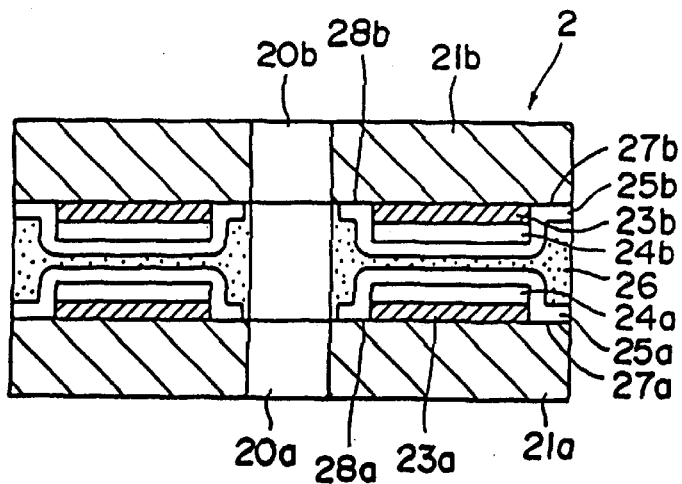
FIG. 3 illustrates another example of the preferred structures of the information recording disc (symmetric type) of the invention.

FIG. 3 illustrates another example of the preferred structures of the invention. The information recording disc 2 is composed of two resinous substrate discs 21a, 21b which have center holes 20a, 20b, respectively and in which the substrate discs 21a, 21b are provided thereon with a recording layer 23a, 23b and a reflective layer 24a, 24b (both are retracted from the outer and inner peripheral edges to leave areas 27a, 27b, 28a, 28b in which the surfaces of the substrate discs 21a, 21b are exposed), and further a protective resin layer 25a, 25b which is coated over the reflective layer 24a, 24b and is in contact with the exposed areas 27a, 27b, 28a, 28b, and an adhesive layer 26.

The protective layers 25a, 25b are in contact with the resinous substrate discs 21a, 21b, respectively, in the outer and inner peripheral exposed area 27a, 27b, 28a, 28b. Therefore, the protective layers 25a, 25b are firmly bonded to the substrate discs 21a, 21b, respectively. The bonding between the protective layer 25a, 25b and the adhesive layer 26a, 26b is naturally firm. Therefore, the information recording disc of FIG. 3 also has a high mechanical strength.

FIGS. 4 to 7 are given to illustrate a process for preparing the information recording disc of FIG. 2.

Figure 4:
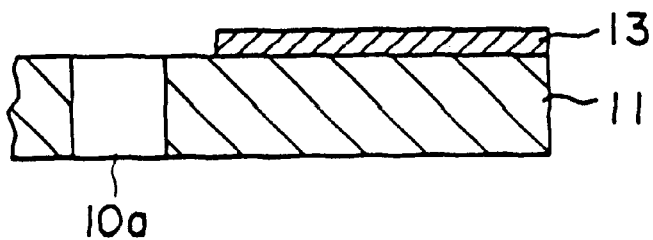
FIGS. 4 to 7 schematically illustrate a process for preparing the information recording disc of FIG. 2.

First, a dye solution is coated on a substrate disc 11 (having a center hole 10a) by known spin coating to form a dye-containing recording layer 13. According to the spin coating, the inner edge of the recording layer 13 can be easily formed apart from the edge of the center hole 10a, as is shown in FIG. 4. Then, the outer peripheral edge area 17 of the substrate disc 11 is exposed by removing the dye-containing recording layer 13 at that area 17. The removal of the outer peripheral area can be performed by washing out the recording layer in that area using an appropriate solvent. The removal of a part of the recording layer can be performed simultaneously with the formation of the recording layer. The removal of a part of the recording layer can be performed after the reflective layer is placed on the recording layer. The method for removing the dye-containing recording layer in the outer peripheral area is described in Japanese Patent Provisional Publications No. H2-183,442 and No. H 2-236,833.

The exposed outer peripheral area preferably has a width of 0.05 to 10 mm, more preferably 0.2 to 1.0 mm. Sometimes, a small portion of the recording layer may remain in the exposed area. However, such remaining recording layer does not essentially disturb the adhesion between the protective layer and the substrate disc.

Figure 5:
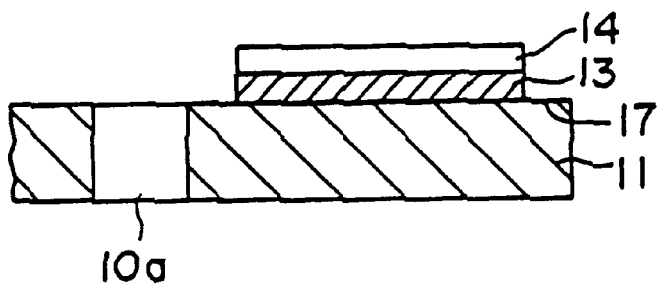

On the recording layer 13, a reflective layer 14 is formed, for instance, by sputtering. The sputtering can be performed using an appropriate mask to leave the exposed area 17, as is illustrated in FIG. 5.

Over the reflective layer 14, a protective layer 15 is coated to extend its edge portion to become in contact with the exposed substrate surface portions 17, 18. The protective layer 15 can be formed by coating a resin solution over the reflective layer 14 by a known coating method such as spin coating.

Figure 6:
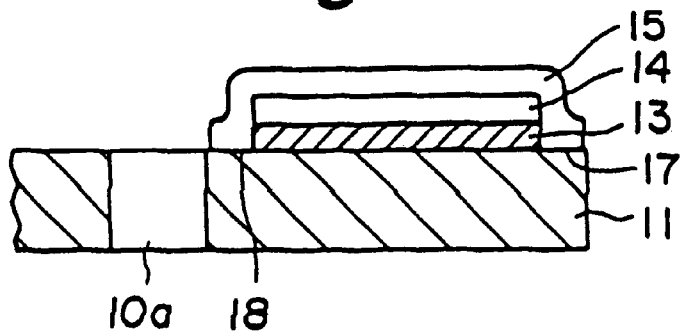
Figure 7:
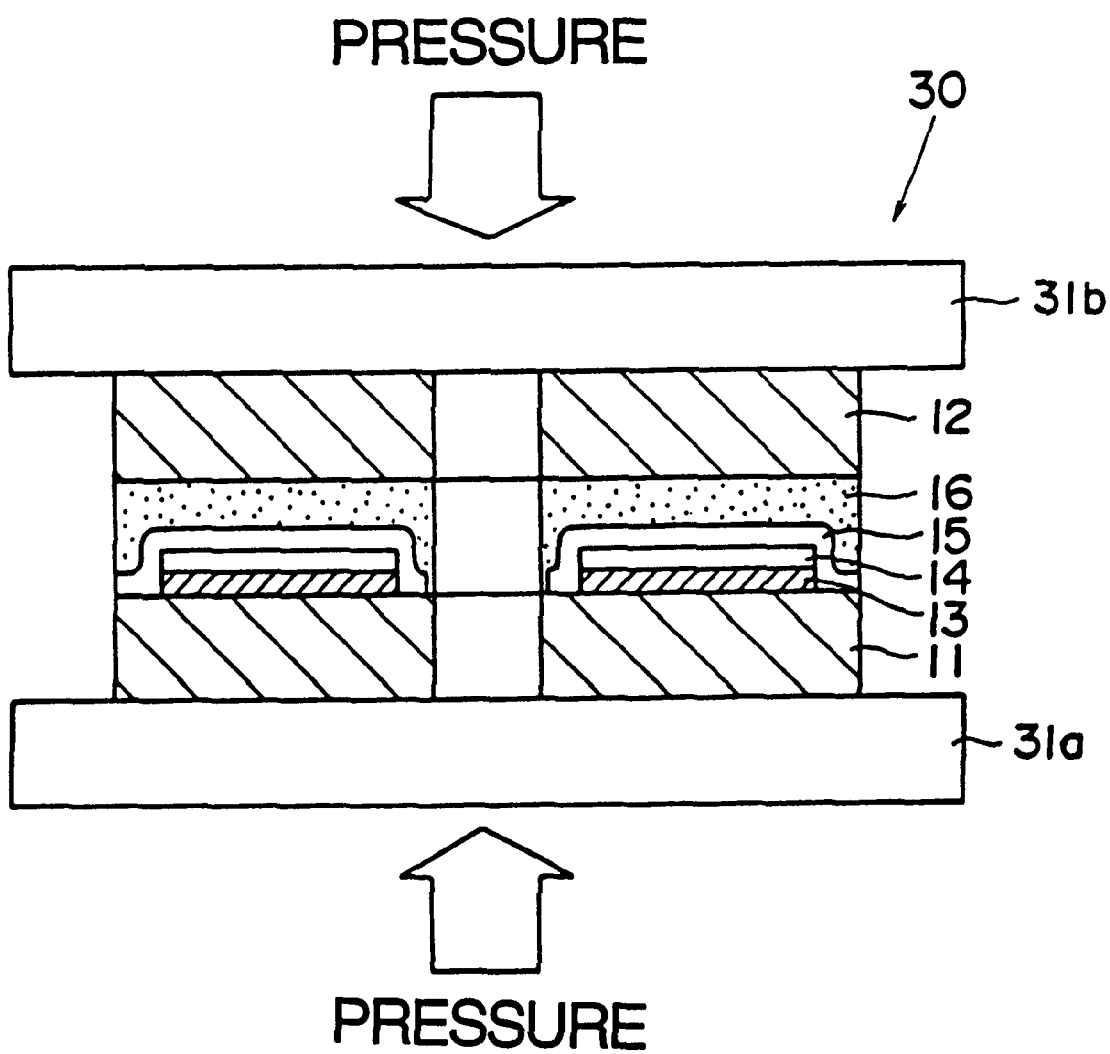

As is seen from FIG. 7, on the substrate disc 11 of FIG. 6 which is provided with the recording layer 13, the reflective layer 14 and the protective layer 15, an adhesive is coated to give an adhesive layer 16, and a disc plate 12 is placed thereon. The resulting composite body is then placed on a press machine 30 and is sandwiched between pressure plates 31a, 31b. The pressure plates 31a, 31b then work to firmly combine the composite body to give the desired information recording disc of FIG. 2.

Figure 8A:
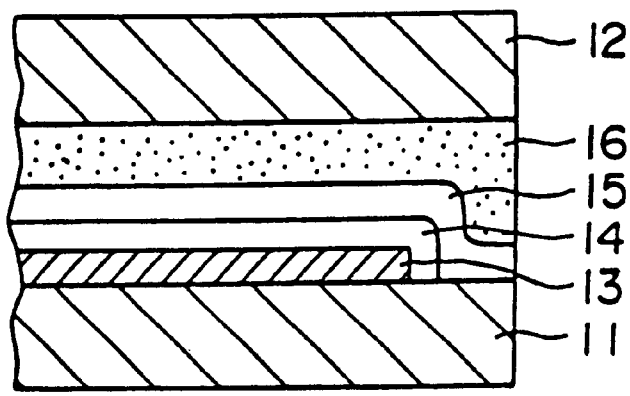
FIGS. 8(a)–(c) illustrate a few variations of the characteristic structure of the information recording disc of FIG. 2.
Figure 8B:
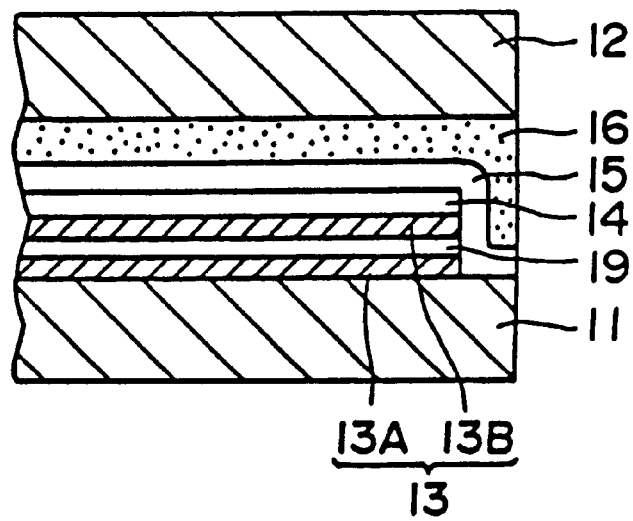
Figure 8C:
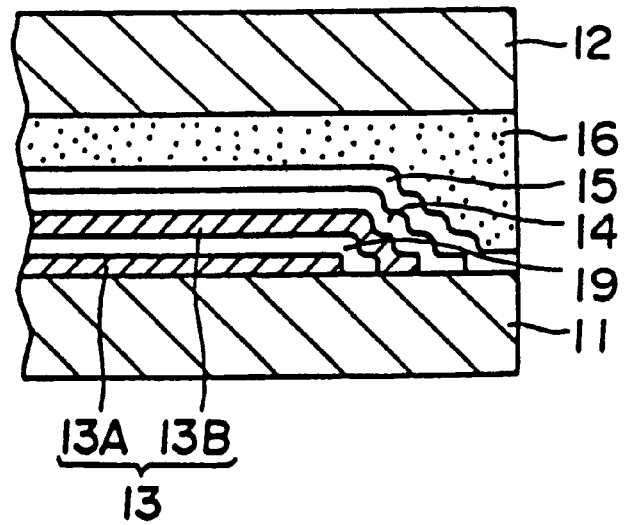

FIG. 8 illustrates a few variations of the characteristic structure of the information recording disc of FIG. 2.

In FIG. 8-(a), the edge portion of the recording layer 13 is covered with the edge portion of the reflective layer 14. In this case, the recording layer 13 is well protected from unfavorable influence by the surrounding atmosphere.

In FIG. 8-(b), the recording layer 13 is composed of two unit recording layers 13A, 13B, between which a resinous intermediate layer (i.e., barrier layer) 19 is placed.

The FIG. 8-(c) illustrates one variation of the composite structure of FIG. 8-(b) in which each over-laying layer covers whole surface of the under-laying layer.

Figure 9:
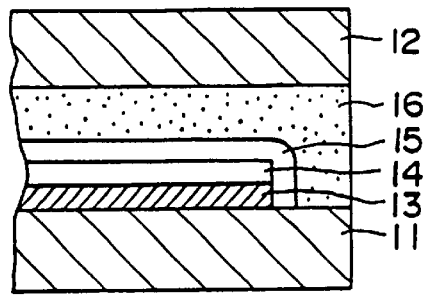
FIG. 9 illustrates a further example of the optical information recording disc of the invention.

In FIG. 9, the outer peripheral end portion of the protective layer 15 as well as the outer peripheral end portion of the adhesive layer 16 are placed in contact with the exposed surface of the substrate disc 11.

Figure 10:
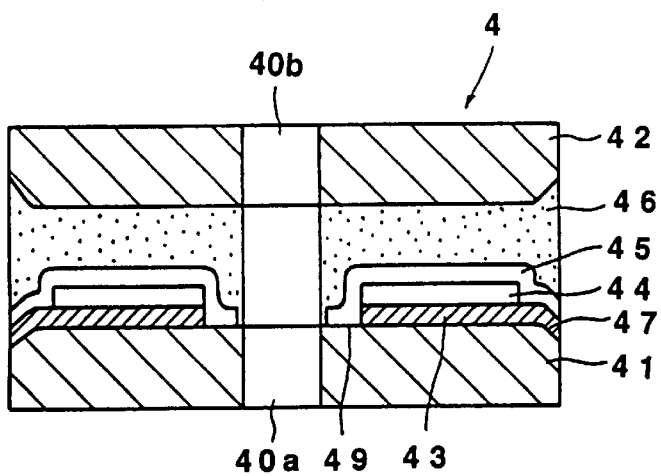
FIGS. 10 to 11 illustrate further examples of the optical information recording disc of the invention.

FIG. 10 illustrates a further example of the optical information recording disc of the invention in which the substrate disc is processed in its outer peripheral edge portion to enlarge the surface area in that portion.

In more detail, the information recording disc 4 comprises a substrate disc 41 which has a center hole 40a and which is provided thereon with a recording layer 43, a reflective layer 44 and a protective layer 45 overlaid in order and a disc plate 42, the substrate disc 41 and the disc plate 42 being combined via an adhesive layer 46 to place the protective layer 45 between them, wherein the substrate disc 41 is processed at its outer peripheral end to form an enlarged surface area 47 and the reflective layer 45 is retracted from the outer peripheral end of the substrate 41. The disc plate 42 is also processed at its outer peripheral end to form an enlarged surface area.

In the structure of FIG. 10, the area in which the substrate surface and the recording layer as well as the area in which the recording layer and the protective layer are enlarged. Therefore, the bonding strength is increased in these areas to improve the mechanical strength of the resulting information recording disc.

Figure 11:
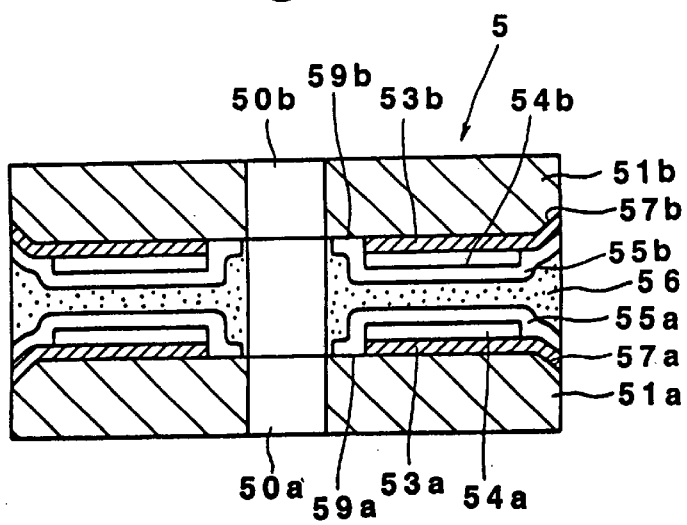

In FIG. 11, an information recording disc 5 comprises a pair of substrate discs 51a, 51b which have a center hole 50a, 50b and which are provided thereon with a recording layer 53a, 53b, a reflective layer 54a, 54b and a protective layer 55a, 55b overlaid in order, the substrate discs 51a, 51b being combined via an adhesive layer 56 to place the protective layers 55a, 55b between them, wherein the substrate discs 51a, 51b are processed at their outer peripheral ends to form an enlarged surface area 57a, 57b and the reflective layers 54a, 54b are retracted from the outer peripheral end of the substrate 51a, 51b, respectively.

In the information recording discs of FIGS. 10 and 11, the recording layers 43, 53a, 53b extend to the outer peripheral end of the substrate discs 41, 51a, 51b, respectively. However, it is preferred that the recording layers are retracted from the outer peripheral end to expose the processed end portion (i.e., exposed area) so that the exposed area is made in contact with a portion of the resinous protective layer.

Figure 12:
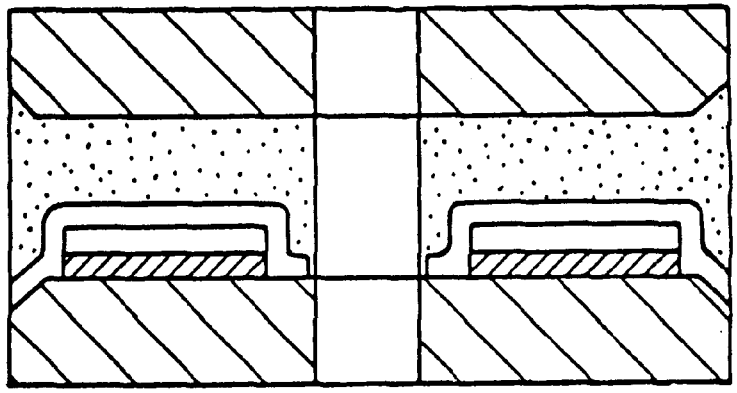
FIGS. 12 to 13 illustrate further examples of the optical information recording disc of the invention.
Figure 13:
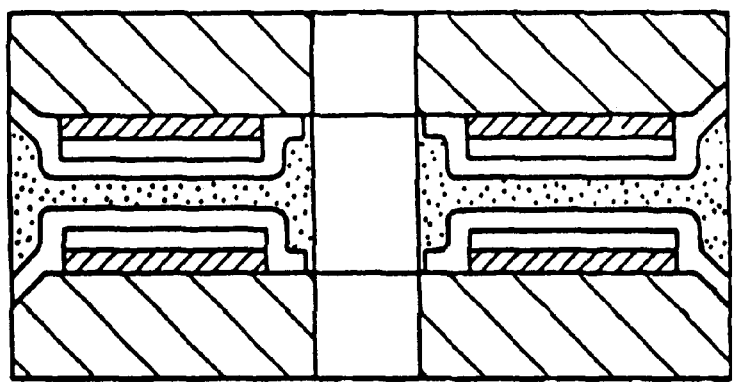

The above-described preferred embodiments are illustrated in FIGS. 12 and 13. The information recording discs of FIGS. 12 and 13 have a further increased mechanical strength.

Figure 14:
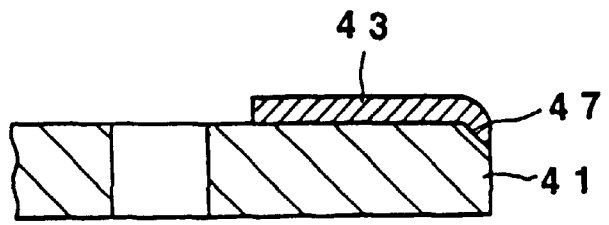
FIGS. 14 to 16 illustrate a process for preparing the information recording disc of FIG. 12.
Figure 15:
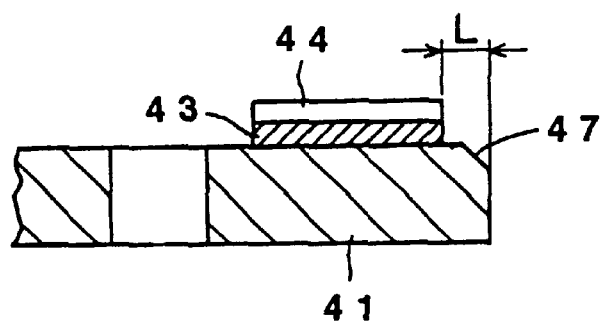
Figure 16:
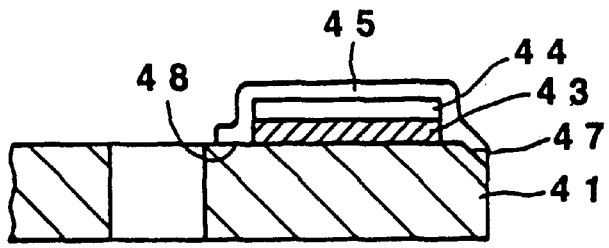

FIGS. 14 to 16 are given to illustrate a process for preparing the information recording disc of FIG. 12.

First, a substrate disc 41 is chamfered at its outer peripheral end to give an enlarge surface area 47. Generally, the edge chamfered substrate disc is directly produced using a mold having the specific dye. A dye solution is coated on a substrate disc 41 by known spin coating to form a dye-containing recording layer 43, as is illustrated in FIG. 14. Then, the enlarged outer peripheral surface are 47 of the substrate disc 41 is exposed by removing the dye-containing recording layer 43 at that area 47.

The exposed outer peripheral area generally has a width ("L" in FIG. 15) of 0.05 to 10 mm, preferably 0.2 to 1.0 mm, or the width generally is 0.05 to 3%, preferably 0.1 to 2%, of the diameter of the substrate disc. The chamfered length in the depth direction of the substrate disc generally is in the range of 1 to 50%, preferably 3 to 30%, of the thickness of the substrate disc.

On the recording layer 43, a reflective layer 44 is formed, as is illustrated in FIG. 15.

Over the reflective layer 44, a protective layer 45 is coated to extend its edge portion to become in contact with the exposed substrate surface portions 47, 48, as is illustrated in FIG. 16.

On the substrate disc 41 of FIG. 16 which is provided with the recording layer 43, the reflective layer 44 and the protective layer 45, an adhesive is coated to give an adhesive layer, and a disc plate is placed thereon, in the same manner as is illustrated in FIG. 7. The resulting composite body is then pressed to give the desired information recording disc of FIG. 12.

Figure 17A:
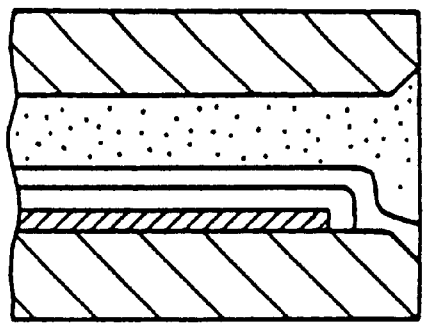
FIGS. 17(a)–(c) illustrates a few variations of the characteristic structure of the information recording disc of FIG. 12.
Figure 17B:
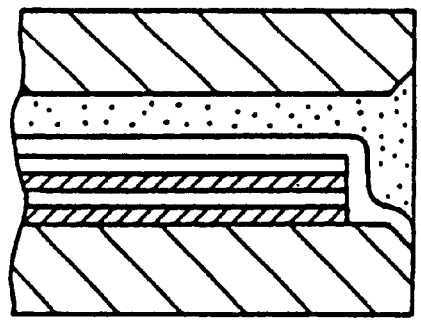
Figure 17C:
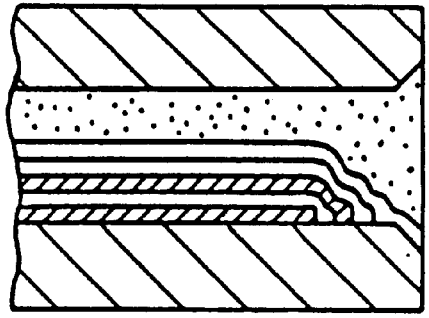
Figure 18A:
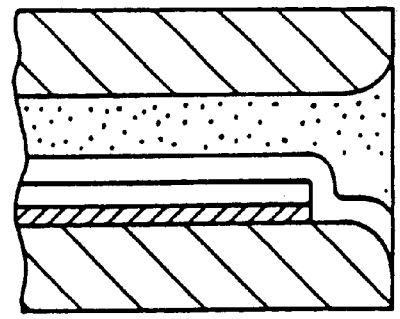
FIGS. 18(a)–(d) illustrates other variations of the characteristic structure of the information recording disc of FIG. 12.
Figure 18B:
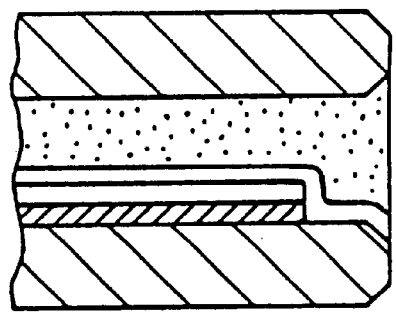
Figure 18C:
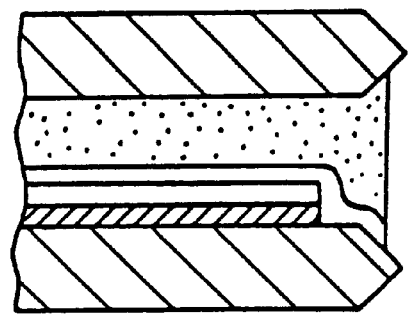
Figure 18D:
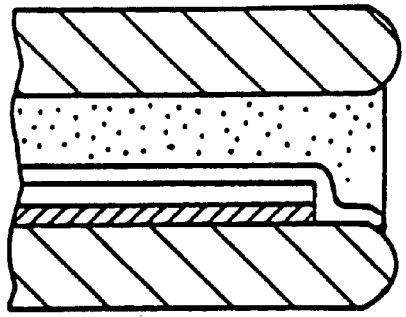
Figure 19A:
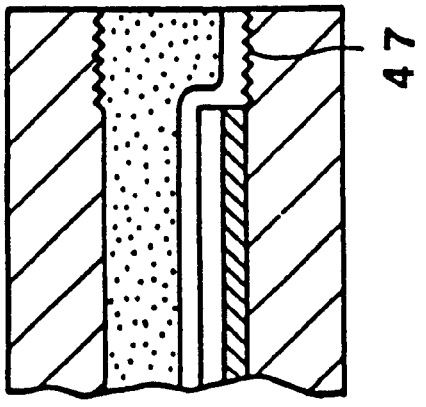
FIGS. 19(a)–(e) illustrates other variations of the characteristic structure of the information recording disc of FIG. 12.
Figure 19B:
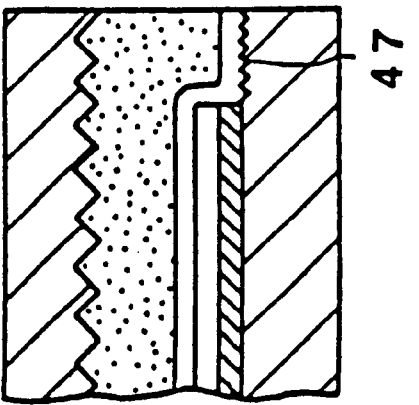
Figure 19C:
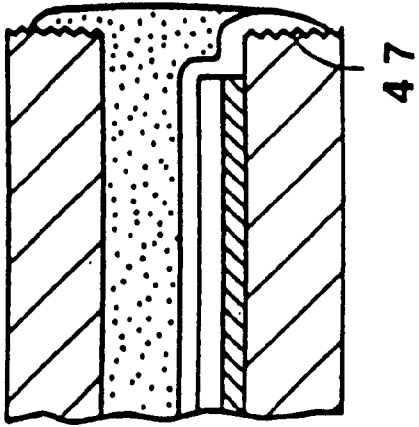
Figure 19D:
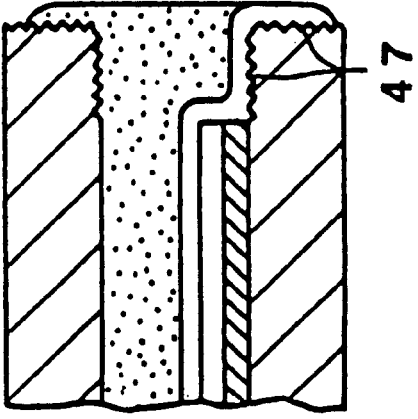
Figure 19E:
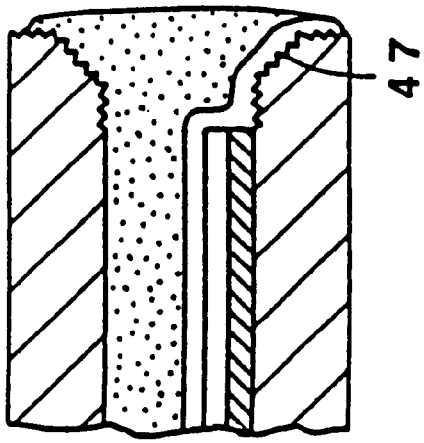
Figure 20A:
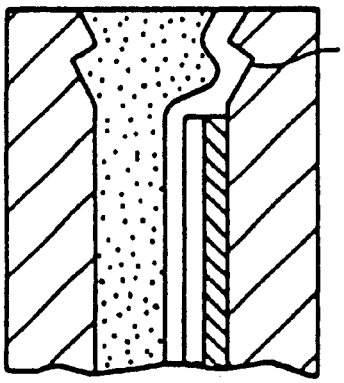
FIGS. 20(a)–(f) illustrates other variations of the characteristic structure of the information recording disc of FIG. 12.
Figure 20B:
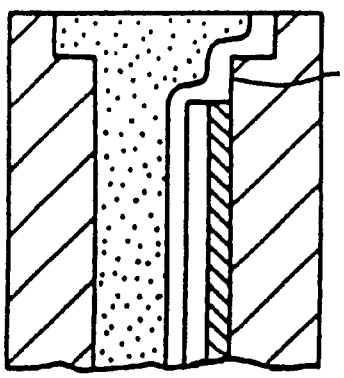
Figure 20C:
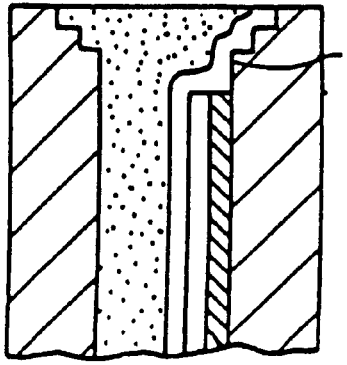
Figure 20D:
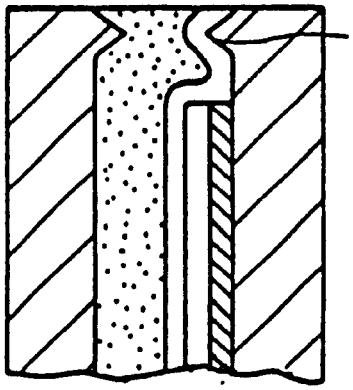
Figure 20E:
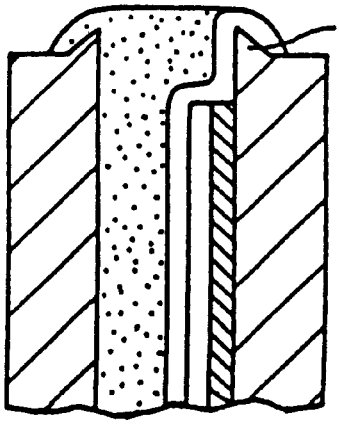
Figure 20F:
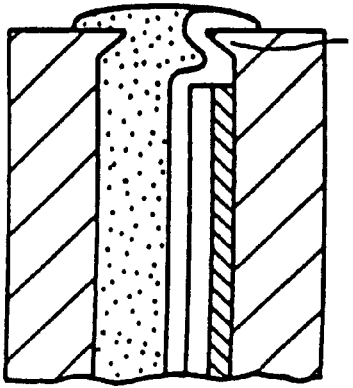
Figure 21A:
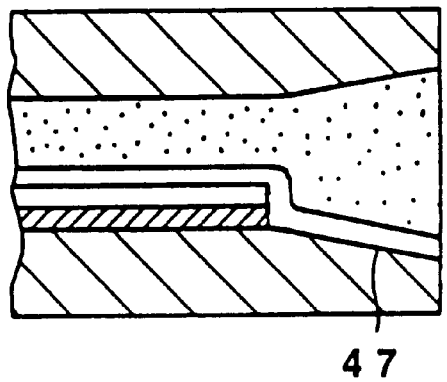
FIGS. 21(a)–(d) illustrates other variations of the characteristic structure of the information recording disc of FIG. 12.
Figure 21B:
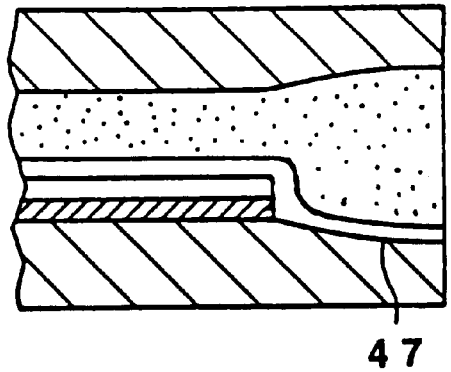
Figure 21C:
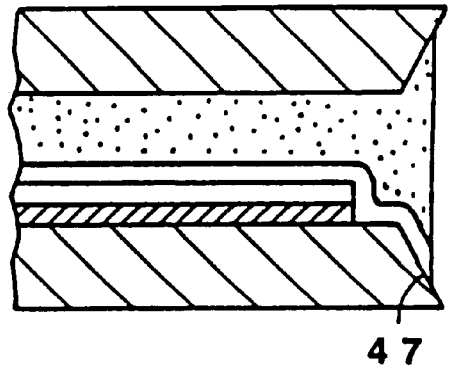
Figure 21D:
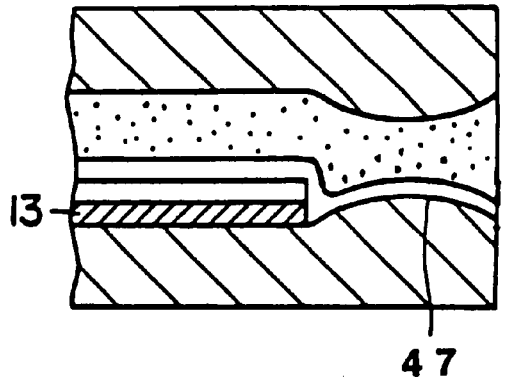

FIG. 17 illustrates a few variations (a), (b) and (c) of the characteristic structure of the information recording disc of FIG. 12.

FIG. 18 illustrates other variations (a), (b), (c) and (d) of the characteristic structure of the information recording disc of FIG. 12.

FIG. 19 illustrates other variations (a), (b), (c), (d) and (e) of the characteristic structure of the information recording disc of FIG. 12. In the variations (a), (b), (c), (d) and (e), the exposed outer peripheral end portion 47 has a surface which has been processed to give a roughed surface.

FIG. 20 illustrates other variations (a), (b), (c), (d), (e) and (f) of the characteristic structure of the information recording disc of FIG. 12. In the variations (a), (b), (c), (d), (e) and (f), the exposed outer peripheral end portion 47 has a surface which has been processed to have an enlarged surface area by deforming the end portion.

FIG. 21 also illustrates other variations (a), (b), (c) and (d) of the characteristic structure of the information recording disc of FIG. 12. In the variations (a), (b), (c) and (d), the exposed outer peripheral end portion 47 has a surface which has been processed to have an enlarged surface area by chamfering or deforming the end portion.

The substrate disc 41, 42 may have outer peripheral end portion which are processed to give an enlarged surface area 47 along the periphery of the disc, as is illustrated in FIG. 22.

Figure 23:
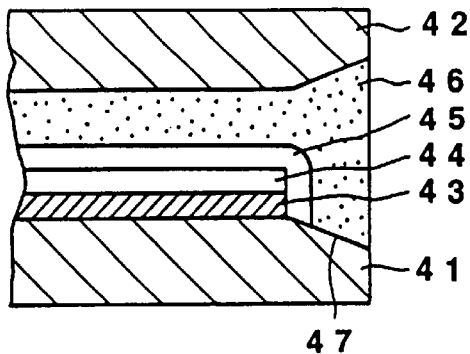
FIG. 23 illustrates s further example of the optical information recording disc of the invention, in which no protective layer is provided.

In FIG. 23, the outer peripheral end portion of the protective layer 45 as well as the outer peripheral end portion of the adhesive layer 46 are placed in contact with the exposed surface of the substrate disc 41.

As is described hereinbefore, the protective layer may be omitted. In that case, the adhesive layer is brought into contact with the exposed surface of the substrate disc.

FIGS. 24 to 30 are given to illustrate the information recording disc of the invention in which the protective layer is removed.

Figure 24:
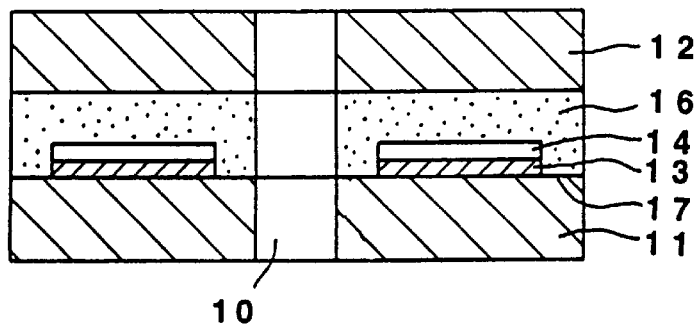
FIGS. 24 to 25 illustrate further examples of the optical information recording disc of the invention which have no protective layer.
Figure 25:
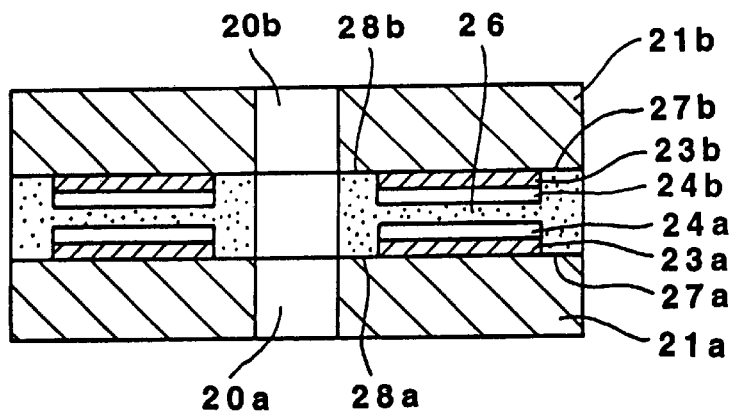

FIGS. 24 and 25 illustrate the protective layer-omitting versions of FIGS. 2 and 3, respectively. The adhesive layers 16 and 26 are brought into contact with the exposed surfaces 17 and 27a, 27b, 28a, 28b of the substrate discs 11 and 21a, 21b, respectively.

Figure 26A:
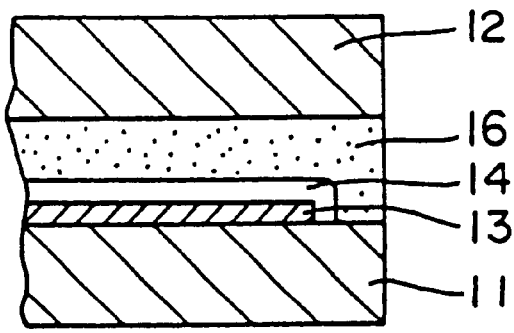
FIGS. 26(a)–(c) illustrates the protective layer-omitting versions of FIG. 8.
Figure 26B:
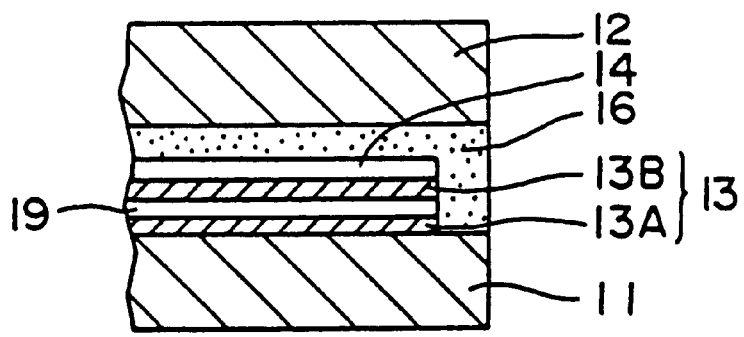
Figure 26C:
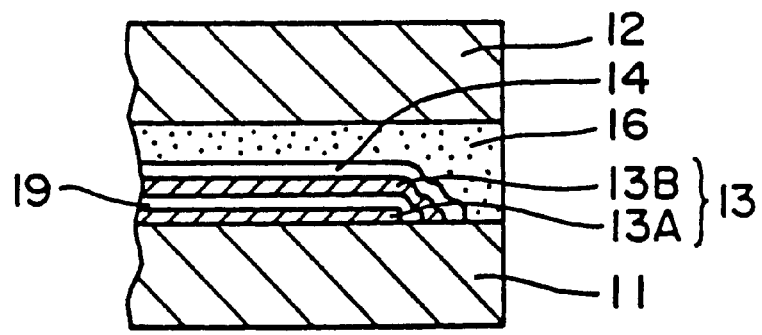

FIGS. 26 illustrates the protective layer-omitting versions of FIG. 8. The adhesive layer 16 is brought into contact with the exposed surface of the substrate disc 11.

Figure 27:
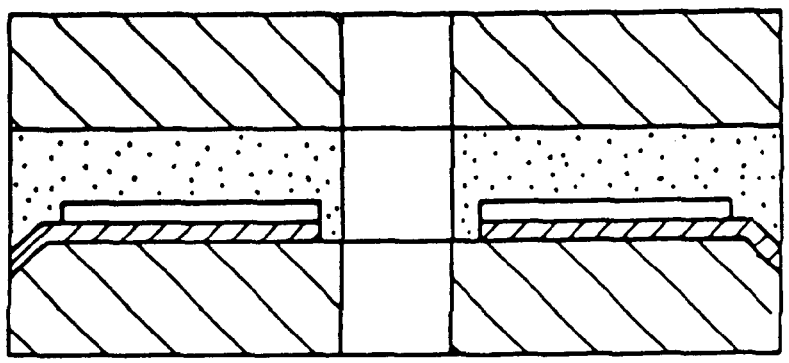
FIGS. 27 and 28 illustrate the protective layer-omitting versions of FIGS. 10 and 11, respectively.
Figure 28:
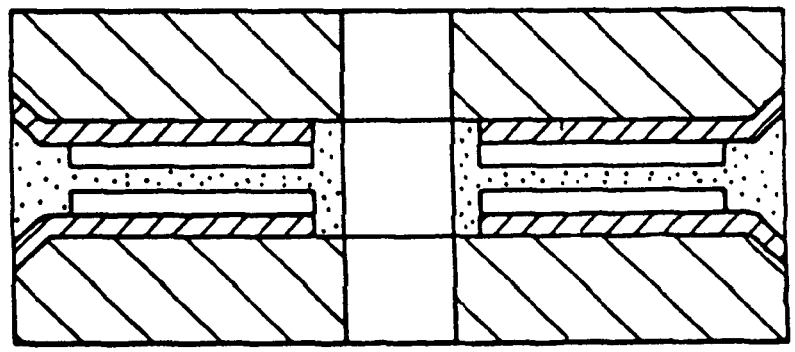

FIGS. 27 and 28 illustrate the protective layer-omitting versions of FIGS. 10 and 11, respectively. The adhesive layer is brought into contact with the recording layer in the chamfered peripheral end portion of the substrate disc.

Figure 29:
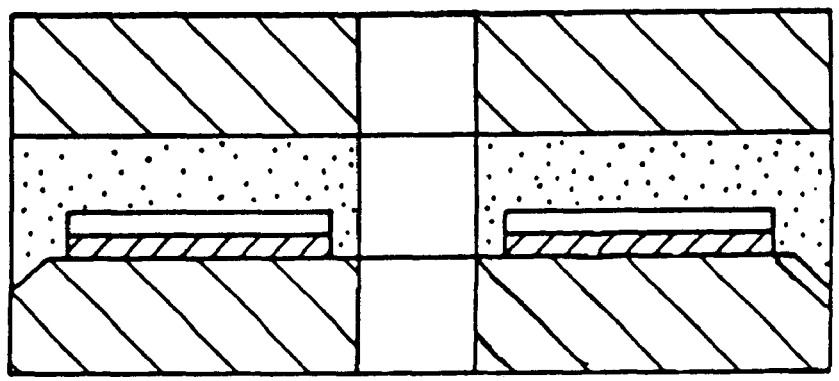
FIGS. 29 and 30 illustrate the protective layer-omitting versions of FIGS. 12 and 13, respectively.
Figure 30:
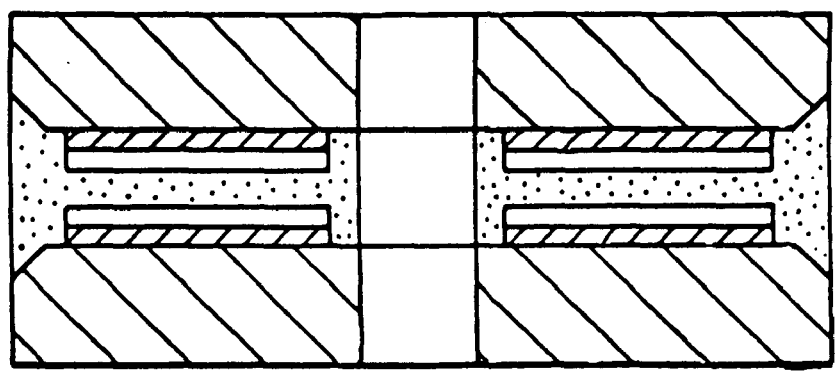

FIGS. 29 and 30 illustrate the protective layer-omitting versions of FIGS. 12 and 13, respectively. The adhesive layer is brought into contact with the chamfered peripheral end portion of the substrate disc. The substrate disc in the chamfered portion is exposed to directly receive the adhesive layer to give an increased bonding strength.

As is describe hereinbefore, a pair of substrate discs having a recording layer and a reflective layer (optionally, and a protective layer) or the substrate disc having a recording layer and a reflective layer (optionally, and a protective layer) and a disc plate can be combined using the specifically designed apparatus, which is illustrated in FIGS. 31 to 38. The specifically designed apparatus can be preferably employed for preparing the information recording disc of the invention. However, the apparatus also can be favorably employed for preparing the information recording disc having the conventional structure.

Figure 31:
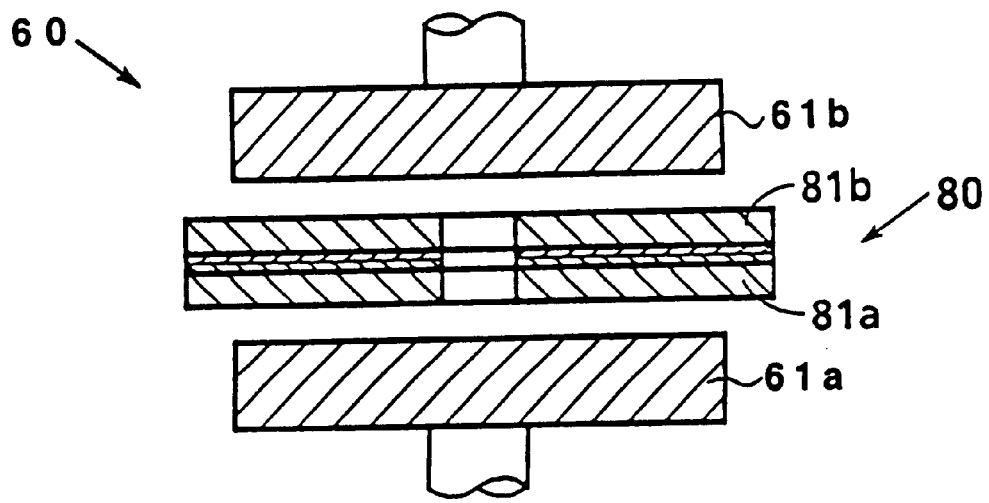
FIGS. 31 to 33, FIGS. 34(a)–(b), and FIGS. 35 to 38 illustrate the specifically designed apparatus which are favorably employable for preparing the information recording disc of the invention or the conventional information recording disc.

In FIG. 31, the apparatus 60 for preparing an optical information recording disc comprises a pair of pressure disc plates 61a, 61b which have an effective pressure diameter smaller than the diameter of the substrate disc 81a, 81b of the information recording disc 80. The term of "effective pressure diameter" means a diameter of a round surface to be brought into contact with the surface of the substrate disc. In FIG. 31, the effective pressure diameter is equal to the diameter of the pressure disc plates 61a, 61b.

Figure 32:
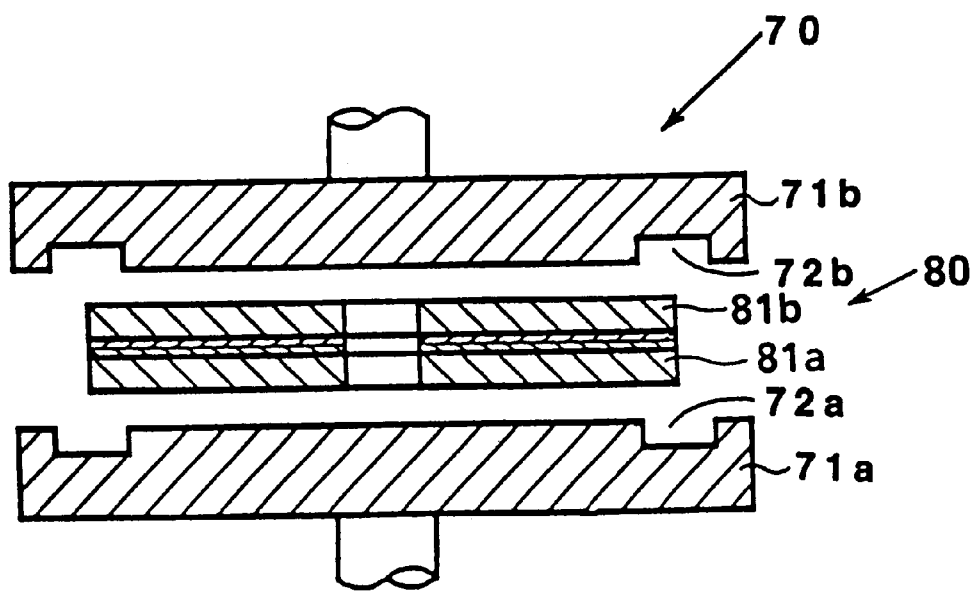

In FIG. 32, the apparatus 70 comprises a pair of pressure disc plates 71a, 71b which also have an effective pressure diameter smaller than the diameter of the substrate disc 81a, 81b of the information recording disc 80. Although the diameter of the pressure disc plate 71a, 71b is larger than the diameter of the substrate disc 81a, 81b, the surface to be brought into contact with the surface of the substrate disc is the area inside of the groove 72a, 72b, which is smaller than the diameter of the substrate disc 81a, 81b.

Figure 33:
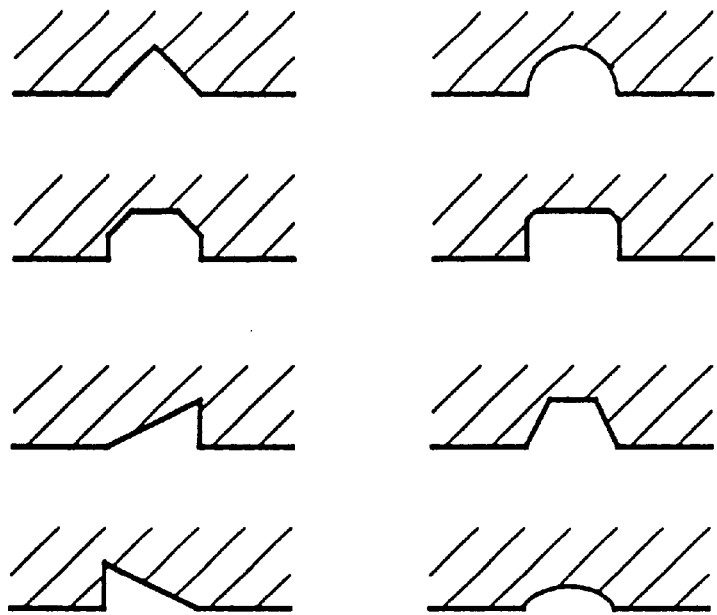

FIG. 33 illustrates various exemplary sections of the groove which can be formed on the pressure plate.

Figure 34A:
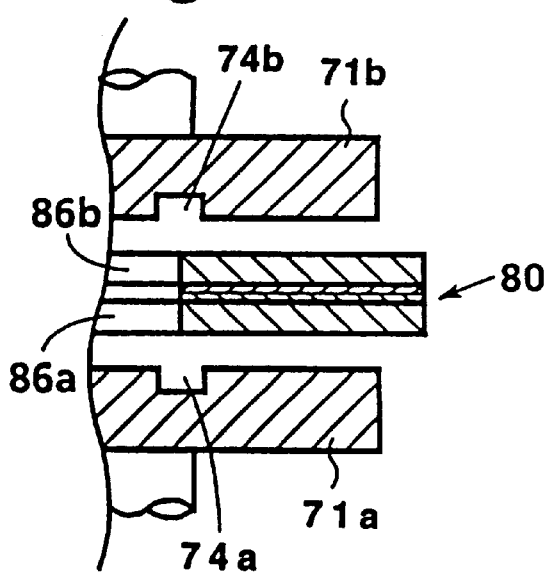
Figure 34B:
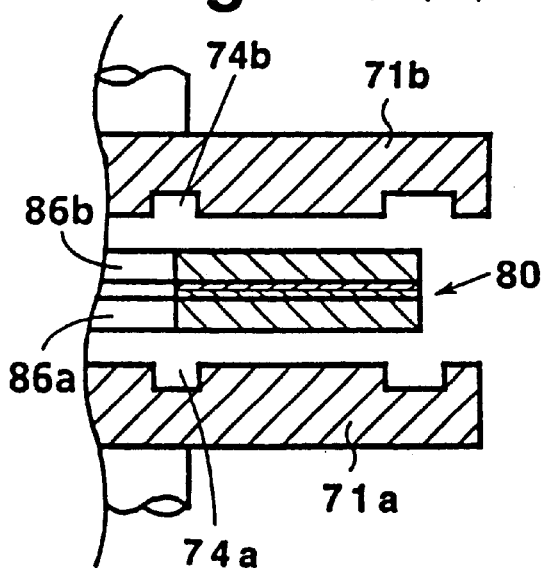

The groove can be formed on the pressure plate in the inner area, as is illustrated in FIG. 34. In the embodiment (a), the groove 74a (74b) is formed in the inner area only, while the two grooves 71a (71b), 74a (74b) are formed in the vicinity of the peripheral end area and the inner area, respectively, in the embodiment (b). The groove in the inner area is effective to obviate undesired contact between the inner edge portion of the substrate disc (corresponding to the periphery of the center hole 86a (86b) of the substrate disc.

Figure 35:
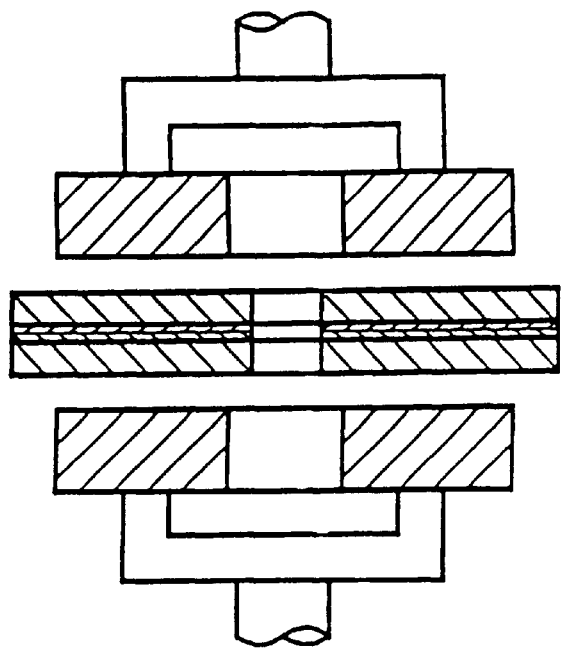

FIG. 35 illustrates a preferred apparatus which has a pressure disc plate in the doughnut form. The pressure disc plate in the form of doughnut form has a diameter smaller than that of the substrate disc, while the diameter of the center hole of the pressure disc plate is larger than that of the center hole of the substrate.

Figure 36:
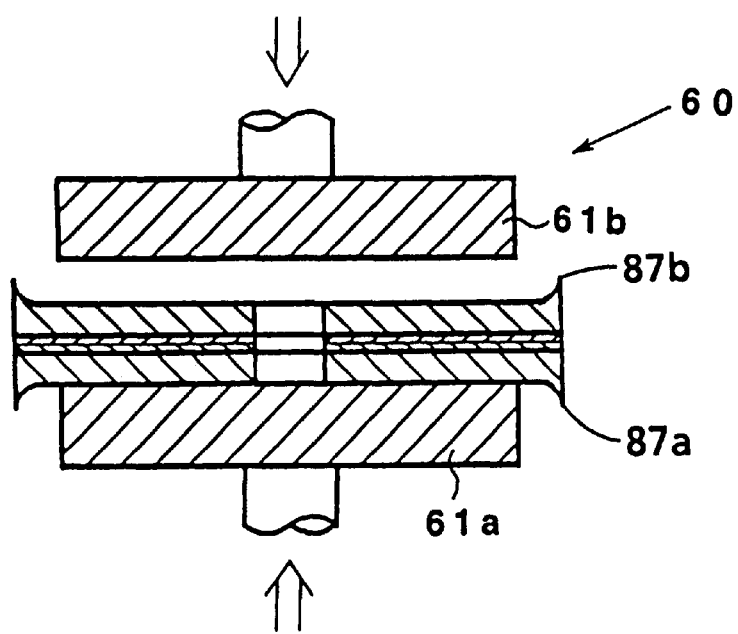

As is seen from FIG. 36, the apparatus 60 having pressure disc plates 61a, 61b with a relatively small effective diameter is favorably employed particularly when a substrate disc has a fin 87a (87b) at the outer peripheral edge. By the use of the pressure disc plate having a relatively small effective diameter, the fins 87a, 87b do not disturb the formation of strong bonding between the substrate discs. The resulting information recording disc has an enough mechanical strength.

Figure 37:
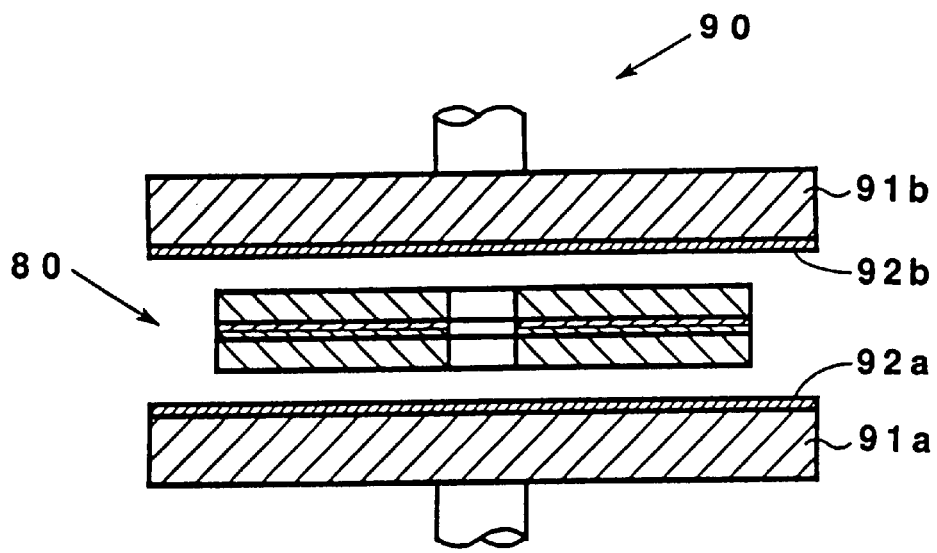

The apparatus illustrated in FIG. 37 is also favorably employed for combining the substrate discs. In more detail, the apparatus 90 comprises a pair of pressure disc plates 91a, 91b which has a surface layer 92a, 92b having a hardness less than the hardness of the substrate disc of the information recording disc 80. The surface layer 92a, 92b preferably has a hardness in the range of 10% to 80%, more preferably 40% to 80%, of the hardness of the substrate disc. The hardness is expressed in terms of Rockwell hardness.

Examples of preferred materials of the surface layers include the following materials. The numeral given in the parentheses following the name of material represents a typical Rockwell hardness of the material. The Rockwell hardness of polycarbonate is 120.

(1) ABS (acrylonitrile-butadiene-styrene) resin resin for extrusion processing, resin of high impact resistance - - - (95) glass fiber reinforced (20 to 40%) resin - - - (83)

(2) Linear aliphatic polyamide resin nylon 6 (elastomer, copolymer) - - - (95)

(3) Polypropylene (PP) powder reinforced - - - (95) non-reinforced - - - (95) copolymer - - - (73) elastomer modified resin of high impact resistance - - - (68)

(4) Cellulose resin ethyl cellulose - - - (83) cellulose acetate - - - (80) cellulose butyrate acetate for molding - - - (74) cellulose butyrate acetate for sheet forming - - - (73) cellulose propionate for molding - - - (66)

(5) Fluoro resin poly(trifluorochloroethylene)=ethylene-modified (E-CrFE) - - - (95) poly(trifluorochloroethylene)=CTFE - - - (85) poly(ethylene fluoride), ethylene-modified, glass fiber reinforced - - - (74) poly(ethylene fluoride), ethylene-modified, ETFE - - - (60)

(6) Polyurethane (PU) resin polyurethane, thermoplastic - - - (50)

The examples of the preferred elastomers favorably employable for the formation of the surface layer having a relatively low hardness include the following:

(1) Urethane rubber simple rubber composition (2) Epichlorohydrin rubber (CHR) carbon compounded, silicate compounded, carbon/oil compounded (3) Fluorinated rubber carbon compounded, simple rubber composition (4) Chlorinated polyethylene (CPE) carbon compounded, clay/oil compounded (5) Chlorosulfonated polyethylene (CSM) carbon compounded (6) Chloroprene rubber (CR) carbon compounded, clay compounded (7) Acrylonitrile-butadiene rubber (NBR) carbon compounded, clay compounded (8) Ethylene-propylene rubber (EPDM) carbon compounded, clay compounded (9) Acryl rubber (ACM) carbon compounded, calcium carbonate compounded
(10) Styrene-butadiene rubber (SBR) clay compounded, carbon compounded
(11) Solution polymerization styrene-butadiene rubber (soluble-SBR) carbon/oil compounded
(12) Polysulfide rubber carbon compounded
(13) Propylene oxide rubber (POR) carbon/oil compounded, simple rubber composition
(14) Natural rubber (NR) silicate/oil compounded, simple rubber composition
(15) Silicone rubber high strength type, general molding type
(16) Butadiene rubber (BR) carbon/oil compounded, carbon compounded
(17) Isoprene rubber (IR) carbon compounded, calcium carbonate compounded, simple rubber composition
(18) Isobutene-isoprene rubber (IIR) talc compounded, carbon compounded The above-mentioned elastomers have a hardness (defined in JIS-K-6301) in the range of 10% to 80%, particularly 30% to 80%. The polycarbonate has a hardness (JIS-K-6301) of 100.

The surface layer having a relatively low hardness generally has a thickness of 0.5 to 10 mm, preferably 1 to 5 mm.

Figure 38:
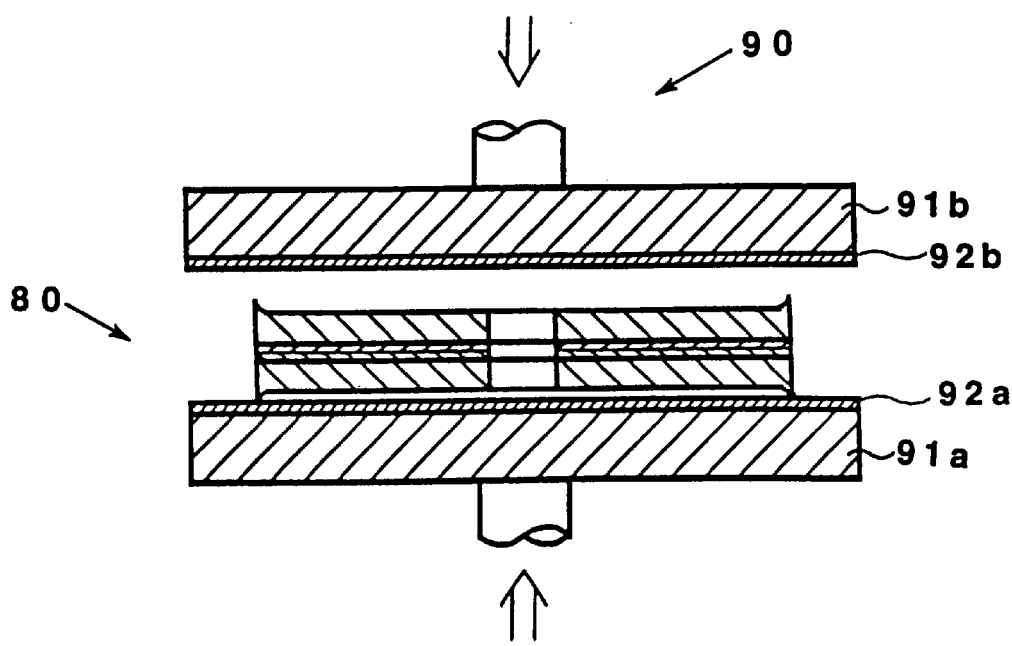

As is seen from FIG. 38, the pressure disc plate having a surface of a relatively low hardness is favorably employed particularly when a substrate disc has a fin at the outer peripheral edge. By the use of the pressure disc plate having a surface of a relatively low hardness, the fins do not disturb the formation of strong bonding between the substrate discs. The resulting information recording disc has an enough mechanical strength.

The present invention is further described by the following examples.

EXAMPLE 1

In 2,2,3,3-tetrahydrofluoropropanol was dissolved a dye having the following formula:

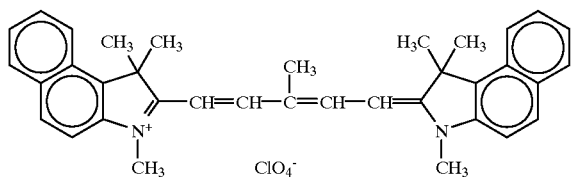

to give a dye solution for forming a recording layer (dye concentration: 2.65 wt. %).

A polycarbonate substrate disc having a center hole and a tracking guide groove (diameter: 120 mm, thickness: 0.6 mm, inner diameter: 15 mm, width of groove: 0.4 $\mu$m, depth of groove: 200 nm) was rotated at a rate of 1,000 rpm, and the dye solution was coated on the rotating substrate disc by spin-coating. The coated dye layer was wiped off only in the inner peripheral area around the center hole, to produce an exposed ring area. The coated dye layer was then heated to 70° C. for 10 minutes to give the recording layer having a thickness of 120 nm, having the form illustrated in FIG. 4.

On the recording layer was deposited Au by vacuum deposition to form a reflective layer having a thickness of 100 nm. In this deposition process, the outer peripheral end of the Au-deposited layer was controlled to take a position slightly inside of the outer peripheral end of the recording layer.

Onto a surface of the substrate disc having the recording layer and reflective layer thereon was sprayed 2,2,3,3-tetrafluoropropanol by spin coating, whereby the recording layer was removed only in the area having no coverage of the reflective layer. Thus, the outer peripheral area of the substrate disc was exposed, as is illustrated in FIG. 5. The width of the exposed are was 0.5 mm.

On the surface of the reflective layer was coated a UV curing resin solution (available from Three Bond Co., Ltd., under product number 3070) by spin coating at a rate of 1,500 rpm. Thereafter, ultra-violet rays from a high pressure mercury lamp were irradiated onto the coated layer to cure the coated layer. The resulting resin layer (i.e., protective layer) had a thickness of 5 $\mu$m.

Subsequently, a UV curing resin solution (available from Three Bond Co., Ltd., under product number 3070) was coated on the surface of the protective layer by spin coating at a rate of 1,500 rpm. On the coated UV curing resin layer was placed a disc plate which was the same as the substrate disc and had an adhesive UV curing resin layer under the condition that the UV curing resin layers faced each other.

The resulting composite body was placed in a combining apparatus between a pair of pressure disc plates (made of quartz glass) and the pressure disc plates were operated to give a pressure of 0.2 kg/cm$^2$ to the composite body. Then, ultra-violet rays from a high pressure mercury lamp were irradiated onto the pressure disc plate on the disc plate side to cure the UV curing resin layer.

The resulting resin layer (i.e., adhesive layer) had a thickness of 8 $\mu$m.

Thus, an optical information recording disc of the invention in the form illustrated in FIG. 2 was manufactured.

Comparison Example 1

The procedures of Example 1 were repeated except that the outer peripheral portion of the recording layer was not removed, to manufacture an optical information recording disc for comparison.

EXAMPLE 2

The procedures of Example 1 were repeated except for replacing the substrate disc with a substrate disc of the same size but having chamfered edge on the outer peripheral side (diameter: 120 mm, thickness: 0.6 mm, inner diameter: 15 mm, width of groove: 0.4 $\mu$m, depth of groove: 200 nm, dimensions of chamfered portion: 0.2 mm for depth direction, 0.5 mm for radial direction) and replacing the disc plate with a disc plate having the same size and the same chamfered edge, to manufacture an optical information recording disc of the invention in the form of FIG. 12.

EXAMPLE 3

The procedures of Example 1 were repeated except for replacing the substrate disc with a substrate disc of the same size but having rough surface edge on the outer peripheral side (diameter: 120 mm, thickness: 0.6 mm, inner diameter: 15 mm, width of groove: 0.4 $\mu$m, depth of groove: 200 nm, surface roughness of the rough surface: 1 $\mu$m, which had been give by sand blast method) and replacing the disc plate with a disc plate having the same size and the same rough surface on the outer peripheral area, to manufacture an optical information recording disc of the invention.

Evaluation of Optical Information Recording Disc

The optical information recording discs obtained in the above-described examples were evaluated on their mechanical strength and storage stability by the following methods.

(1) Drop impact test

The information recording disc was dropped ten times onto a concrete floor from the position of 1 m high, and the disc was checked whether there was observed separation at the outer edge portion or not under the following criteria:

A: Almost no separation was observed.

B: Slight separation was observed.

C: Separation was clearly noted.

(2) Measurement of C/N on the outer peripheral area of groove

On the information recording disc, data of 11T were recorded at 1.2 m/sec and reproduced on the outer peripheral area of groove by means of DDU 1000 (available from Pulstech Corp.). The reproduced data were measured by means of Spectrum Analyzer TR4135 (available from Advantest Co., Ltd.).

In addition, the information recording disc was stored for 240 hours under the conditions of 80° C. and 85% RH, and the stored disc was observed at the edge portion. The appearance of the edge portion was evaluated in the same criteria as those of Drop impact test. The stored disc was further measured on its C/N on the outer peripheral area of groove in the same manner.

The results are set forth in Table 1.

TABLE 1

| Recording | Before Storage | | After Storage | |
|---|---|---|---|---|
| Disc | Drop impact | C/N | Appearance | C/N |
| Example 1 | A | 55dB | A | 53dB |
| Example 2 | A | 56dB | A | 53dB |
| Example 3 | A | 56dB | A | 53dB |
| Com. Ex. 1 | C | 52dB | C | 49dB |

EXAMPLE 4

The procedures of Example 1 were repeated except for not providing the protective layer, to manufacture an optical information recording disc of the invention in the form of FIG. 22.

Comparison Example 2

The procedures of Example 1 were repeated except that the protective layer was not provided and that the outer peripheral portion of the recording layer was not removed, to manufacture an optical information recording disc for comparison.

EXAMPLE 5

The procedures of Example 1 were repeated except for not providing the protective layer, replacing the substrate disc with a substrate disc of the same size but having chamfered edge on the outer peripheral side ( diameter: 120 mm, thickness: 0.6 mm, inner diameter: 15 mm, width of groove: 0.4 μm, depth of groove: 200 nm, dimensions of chamfered portion: 0.2 mm for depth direction, 0.5 mm for radial direction), and replacing the disc plate with a disc plate having the same size and the same chamfered edge, to manufacture an optical information recording disc of the invention in the form of FIG. 29.

EXAMPLE 6

The procedures of Example 1 were repeated except for not providing the protective layer, replacing the substrate disc with a substrate disc of the same size but having rough surface edge on the outer peripheral side (diameter: 120 mm, thickness: 0.6 mm, inner diameter: 15 mm, width of groove: 0.4 μm, depth of groove: 200 nm, surface roughness of the rough surface: 1 μm, which had been give by sand blast method), and replacing the disc plate with a disc plate having the same size and the same rough surface on the outer peripheral area, to manufacture an optical information recording disc of the invention.

Evaluation of Optical Information Recording Disc

The optical information recording discs obtained in the above-described examples were evaluated on their mechanical strength and storage stability by the methods described for the evaluation of the information recording discs of Examples 1–3 and Comparison Example 1.

The results are set forth in Table 2.

TABLE 2

| Recording | Before Storage | | After Storage | |
|---|---|---|---|---|
| Disc | Drop impact | C/N | Appearance | C/N |
| Example 4 | A | 55dB | A | 53dB |
| Example 5 | A | 56dB | A | 53dB |
| Example 6 | A | 56dB | A | 52dB |
| Com. Ex. 2 | C | 52dB | C | 49dB |

What is claimed is:

1. An optical information recording disc comprising a pair of polymer substrate discs which have a center hole and which are provided thereon with a recording dye layer, a reflective layer and a protective resin layer overlaid in order, the substrate discs being combined via an adhesive layer to place their protective layers between them, wherein both the recording layer and reflective layer are retracted from the outer peripheral end of the substrate disc so that the substrate disc is exposed in the retracted area and the protective layer fully covers the substrate disc in the exposed area.

2. The information recording disc of claim 1, wherein both the recording layer and reflective layer are further retracted from the peripheral end of the center hole so that the substrate disc is exposed in thus retracted area and the protective layer is kept in contact with the substrate disc in thus exposed area.

3. The information recording disc of claim 1, wherein the adhesive layer is also kept in contact with the substrate disc in the exposed area.

4. The information recording disc of claim 1, wherein the recording layer is a dye layer.

5. An optical information recording disc comprising a pair of polymer substrate discs which have a center hole and which are provided thereon with a recording dye layer, a reflective layer and a protective resin layer overlaid in order, the substrate discs being combined via an adhesive layer to place their protective layers between them, or comprising a polymer substrate disc which has a center hole and which is provided thereon with a recording dye layer, a reflective layer and a protective resin layer overlaid in order and a polymer disc plate, the substrate disc and the disc plate being combined via an adhesive layer to place the protective layer between them, wherein the substrate disc is processed at its outer peripheral end to form an enlarged surface area and the reflective layer is retracted from the outer peripheral end of the substrate.

6. The information recording disc of claim 5, wherein both the recording layer and reflective layer are retracted from the outer peripheral end of the substrate. disc so that the substrate disc is exposed in the retracted area and the protective layer is kept in contact with the substrate disc in the exposed area.

7. The information recording disc of claim 5, wherein the substrate disc is further-processed at its inner peripheral end to form an enlarged surface area, both the recording layer and reflective layer are further retracted from the inner peripheral end so that the substrate disc is exposed in thus retracted area, and the protective layer is kept in contact with the substrate disc in thus exposed area.

8. The information recording disc of claim 5, wherein the adhesive layer is also kept in contact with the substrate disc in the exposed area.

9. The information recording disc of claim 5, wherein the processing for forming the enlarged surface area has been performed by roughing or chamfering the outer peripheral end of the substrate disc.

10. The information recording disc of claim 5, wherein the recording layer is a dye layer.

11. An optical information recording disc comprising a pair of polymer substrate discs which have a center hole and which are provided thereon with a recording dye layer and a reflective layer overlaid in order, the substrate discs being combined via an adhesive layer to place their reflective layers between them, or comprising a polymer substrate disc which has a center hole and which is provided thereon with a recording dye layer and a reflective layer overlaid in order and a polymer disc plate, the substrate disc and the disc plate being combined via an adhesive layer to place the reflective layer between them, wherein both the recording layer and reflective layer are retracted from the outer peripheral end of the substrate disc so that the substrate disc is exposed in the retracted area and the adhesive layer is kept in contact with the substrate disc in the exposed area.

12. The information recording disc of claim 11, wherein both the recording layer and reflective layer are further retracted from the peripheral end of the center hole so that the substrate disc is exposed in thus retracted area and the adhesive is kept in contact with the substrate disc in thus exposed area.

13. The information recording disc of claim 11, wherein the recording layer is a dye layer.

14. An optical information recording disc comprising a pair of polymer substrate discs which have a center hole and which are provided thereon with a recording dye layer and a reflective layer overlaid in order, the substrate discs being combined via an adhesive layer to place their reflective layers between them, or comprising a polymer substrate disc which has a center hole and which is provided thereon with a recording dye layer and a reflective layer overlaid in order and a polymer disc plate, the substrate disc and the disc plate being combined via an adhesive layer to place the reflective layer between them, wherein the substrate disc is processed at its outer peripheral end to form an enlarged surface area and the reflective layer is retracted from the outer peripheral end of the substrate.

15. The information recording disc of claim 14, wherein both the recording layer and reflective layer are retracted from the outer peripheral end of the substrate disc so that the substrate disc is exposed in the retracted area and the adhesive is kept in contact with the substrate disc in the exposed area.

16. The information recording disc of claim 14, wherein the substrate disc is further processed at its inner peripheral end to form an enlarged surface area, both the recording layer and reflective layer are further retracted from the inner peripheral end so that the substrate disc is exposed in thus retracted area and the adhesive layer is kept in contact with the substrate disc in thus exposed area.

17. The information recording disc of claim 14, wherein the adhesive layer is also kept in contact with the substrate disc in the exposed area.

18. The information recording disc of claim 14, wherein the processing for forming the enlarged surface area has been performed by roughing or chamfering the outer peripheral end of the substrate disc.

19. The information recording disc of claim 14, wherein the recording layer is a dye layer.

* * * * *